United States Patent [19]
George et al.

[11] Patent Number: 6,043,609
[45] Date of Patent: Mar. 28, 2000

[54] CONTROL CIRCUIT AND METHOD FOR ILLUMINATING AN ELECTROLUMINESCENT PANEL

[75] Inventors: Douglas A. George, Watertown; Gustaf T. Appelberg, Fairfield, both of Conn.; Joseph W. Fleming, Ramsey, N.J.; David Richard Ross, Orange, Conn.

[73] Assignee: E-Lite Technologies, Inc., Trumbull, Conn.

[21] Appl. No.: 09/073,483

[22] Filed: May 6, 1998

[51] Int. Cl.[7] .................................................... G09G 3/10
[52] U.S. Cl. .................. 315/169.3; 315/291; 315/209 R; 315/DIG. 7
[58] Field of Search ................................. 315/169.3, 291, 315/200 R, 209 R, 244, DIG. 7; 363/21, 97; 323/222, 288

[56] References Cited

U.S. PATENT DOCUMENTS

| | | | |
|---|---|---|---|
| 4,988,889 | 1/1991 | Oughton, Jr. ............................... | 307/66 |
| 5,144,203 | 9/1992 | Fujita et al. ........................... | 315/169.3 |
| 5,293,098 | 3/1994 | Brownell ................................ | 315/169.3 |
| 5,335,162 | 8/1994 | Martin-Lopez et al. ................... | 363/97 |
| 5,463,283 | 10/1995 | Sanderson ............................. | 315/209 R |
| 5,517,089 | 5/1996 | Ravid ....................................... | 315/307 |
| 5,612,858 | 3/1997 | Weinmeier et al. ...................... | 363/21 |
| 5,677,599 | 10/1997 | Wood . | |

*Primary Examiner*—Haissa Philogene
*Attorney, Agent, or Firm*—Ware, Fressola, Van der Sluys & Adolphson LLP

[57] ABSTRACT

A power supply or inverter circuit is provided for regulating power to electroluminescent lamps over a range of lamp sizes. The power supply may have an AC and/or DC input and includes at least one switch having a power input to be coupled to an electrical power source, a control input, and an output to be coupled to an electroluminescent lamp for being switched on and off to generate a drive signal to the lamp having a predetermined constant frequency and current level that is selectable over a range of frequency and current levels. A constant current mode controller has a control output coupled to the control input of the switch for turning the switch on and off so as to maintain a constant current level and frequency of the drive signal to the electroluminescent lamp substantially over its operating life. The voltage applied to the lamp is allowed to increase to a predetermined voltage limiting value in order to provide compensation due to aging of the lamp.

26 Claims, 3 Drawing Sheets

CONTROL CIRCUIT AND METHOD FOR ILLUMINATING AN ELECTROLUMINESCENT PANEL

FIELD OF THE INVENTION

The present invention relates generally to a control circuit for regulating power to a lamp, and more particularly to a power supply or inverter circuit for regulating power to an electroluminescent lamp or panel.

BACKGROUND OF THE INVENTION

Power supplies for electroluminescent lamps or panels typically include inverters having a regulated or fixed output, or a tuned circuit for a single lamp or panel size. The tuned inverters can only be tuned for single lamp sizes. In other words, the tuned circuitry requires that the inverter be matched to the size or surface area of the panel. Such tuned inverters have some compensation for change in lamp load due to aging in that the drive signal current, voltage and frequency will rise slowly over time as the lamp ages in order to maintain power to the lamp. There are several drawbacks with prior tuned inverters. First, the inverters cannot power a range of lamp sizes. Hundreds of distinct inverters are necessary to be inventoried in order to cover the entire range of lamp sizes which is both inefficient and uneconomical. Second, these tuned inverters provide only modest compensation for change in the lamp load due to aging. Such compensation only marginally improves half life over regulated or constant or fixed output inverters. Third, permitting the frequency to drift as compensation for lamp aging results in an undesirable color shift emanating from the lamp and may result in a shorter operating life.

Inverters that have regulated or fixed outputs can power a range of lamp sizes, but have no compensation to the changing load of the lamp as it ages over its operating life. Therefore, the brightness half-life values of such fixed output inverters are relatively short. An additional drawback with both fixed output and tuned inverters is that they have been known to provide only DC voltage inputs, but not AC voltage inputs, such as at 115 VAC or 230 VAC. For large lamps, AC voltage inputs are the only practical means of operation.

There has been a recent demand for brighter electroluminescent lamps even if such brighter lamps should result in a shorter total operating life. Furthermore, the market is demanding an electroluminescent power supply which operates over a range of lamp sizes without the above-mentioned disadvantages.

Accordingly, it is an object of the present invention to provide a power supply which operates over a range of lamp sizes while providing voltage compensation due to aging of the lamp.

It is another object of the present invention to provide a power supply for an electroluminescent lamp which better maintains the brightness of the lamp over its operating life.

It is yet another object of the present invention to provide a longer operating half life of the electroluminescent lamp.

It is yet another object of the present invention to provide a power supply having temperature compensation with limits for outdoor temperatures through voltage limiting in order to prevent runaway voltages.

It is still another object of the present invention to provide a power supply which prevents a color shift in the lamp load due to aging.

The above and other objects and advantages of this invention will become more readily apparent when the following description is read in conjunction with the accompanying drawings.

SUMMARY OF THE INVENTION

According to the present invention, a power supply or inverter circuit is provided for regulating power to an electroluminescent lamp over a range of lamp sizes with compensation for aging of the lamp. The power supply includes at least one switch having a power input to be coupled to an electrical power source, a control input, and an output to be coupled to an electroluminescent lamp for being switched on and off to generate a drive signal to the lamp having a predetermined constant frequency and current level. A constant current mode controller maintains the constant current level and frequency of the drive signal to the electroluminescent lamp. The constant frequency prevents undesirable color shifts. The voltage applied to the lamp rises to compensate for aging until a predetermined limiting voltage is reached. Once the predetermined limiting voltage is reached, the power supply will operate with a constant voltage drive signal over the balance of the operating life of the lamp.

According to another aspect of the present invention, a method of regulating power to an electroluminescent lamp over a range of lamp sizes with compensation due to aging of the lamp includes providing at least one switch having an input coupled to a electric power source, and an output for transmitting an electric power signal to illuminate an electroluminescent lamp. The switch is opened and closed in order to generate an ac drive signal for illuminating the lamp having a predetermined constant current and frequency. The voltage applied to the lamp rises to compensate for aging until a predetermined limiting voltage is reached. Once the predetermined limiting voltage is reached, the power supply will operate with a constant voltage drive signal over the balance of the operating life of the lamp.

One advantage of the present invention is that a large range of lamp sizes may be powered from a single inverter, yet the inverter compensates for aging of the lamp through a constant current and frequency operating mode. Such compensation permits the drive voltage to increase while maintaining a generally fixed frequency and current. The compensation also permits the drive voltage to rise more rapidly than prior tuned inverters resulting in a slower decay of light output. A second advantage of the present invention is that the power supply permits temperature compensation through the adjustment of the drive signal voltage. A third advantage is that the invention may operate over a wide range of output voltage and frequency combinations to meet the operating requirements of a variety of lamps. A fourth advantage is that the invention may be powered by an AC input that is practical for large lamps, or by a DC input which is practical for automotive and other mobile and remote applications. A fifth advantage is that the fixed frequency drive signal prevents undesirable color shifts in the lamp due to aging. Further advantages will be made apparent with reference to the accompanying specification and drawings.

DETAILED DESCRIPTION OF THE PREFERRED EMBODIMENTS

Figure 1:
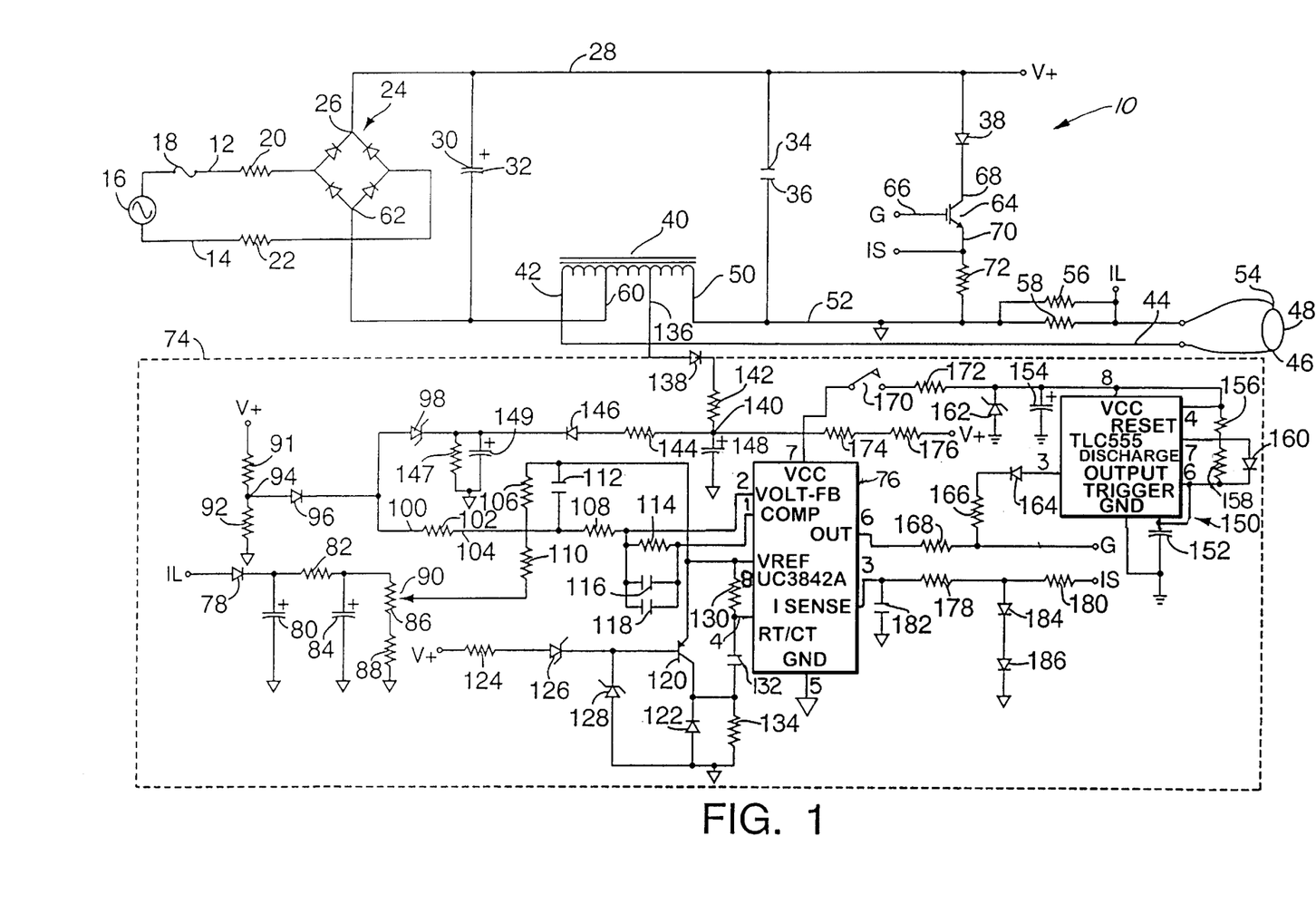
FIG. 1 is a schematic electrical circuit of a power supply for an electroluminescent lamp.

Turning now to FIG. 1, a power supply or inverter circuit employing active constant current feedback and embodying the present invention is generally designated by the reference number 10. The present invention is believed to be the first to employ an AC input where such input is more practical than DC for powering large lamp sizes. The inverter circuit includes power source input lines 12, 14 to be coupled across a power source 16, such as a 115 vac power source. The power supply may also be powered directly from a DC source by removing or bypassing the rectification circuit described below. DC operation is useful for automotive and other mobile and remote applications where AC operation is impractical. The input lines may include a fuse 18, and current limiting resistors 20, 22. A full wave bridge rectifier 24 has its AC input lines coupled to the power source input lines 12, 14 for rectifying an AC signal generated by the power source 16 into a DC signal. A positive DC rectifier output 26 of the rectifier 24 is coupled along a supply line 28 to a first end 30 of a capacitor 32, a first end 34 of a capacitor 36 and to an anode of a diode 38. A second end of the capacitor 32 is coupled to a negative DC rectifier output 62 of the rectifier 24.

A transformer 40 includes a first end terminal 42 to be coupled via line 44 to a first load terminal 46 for an electroluminescent lamp 48, and a second end terminal 50 to be coupled via line 52, which is at ground potential, to a second load terminal 54 for the lamp 48. The transformer 40 is preferably a toroid design to reduce noise and heat generation due to operation of the power supply in the audible frequency range. Parallel resistors 56, 58 may be interposed along the line 52 between the second end terminal 50 of the transformer 40 and the second load terminal 54 of the lamp 48. A first intermediate terminal 60 of the transformer 40 is coupled to the negative DC rectifier output 62 of the rectifier 24, and to a second end of the capacitor 32. A transistor 64, such as an insulated gate bipolar junction transistor (IGBJT), has a gate 66 for receiving a voltage for turning on/off the transistor. A collector 68 of the transistor 64 is coupled to a cathode of the diode 38, and an emitter 70 of the transistor is coupled via a resistor 72 to the line 52.

A control sub-circuit generally enclosed by the dashed lines 74 controls the switching on and off timing of the transistor 64 to generate a pulse width modulated (pwm) waveform for powering the electroluminescent lamp 48 at a substantially constant current level over the operating life of the lamp. The control sub-circuit 74 includes a constant current mode pwm controller 76, such as a UC 3842A controller. The controller 76 has eight terminals: COMP, VOLT-FB, I SENSE, RT/CT, GND, OUT, VCC and VREF.

The controller sub-circuit 74 includes a diode 78 having an anode coupled to the second load terminal 54 for the lamp 48. A cathode of the diode 78 is coupled to ground potential via a capacitor 80. A series connected resistor 82 and capacitor 84 are coupled in parallel with the capacitor 80. Resistors 86 and 88 are coupled in series with one another and in parallel with the capacitor 84. The resistor 86 is preferably a potentiometer, as shown in FIG. 1, having a wiper 90 that is manually adjustable.

The control sub-circuit 74 further includes series connected resistors 91, 92 coupled between the line 28 and ground potential. A junction 94 of the resistors 91, 92 is coupled to an anode of a diode 96. A cathode of the diode 96 is coupled to an anode of a zener diode 98, and a first end 100 of a resistor 102. A second end 104 of the resistor 102 is coupled to a first end of resistors 106, 108, 110 and capacitor 112. A second end of the resistor 110 is coupled to the wiper 90 of the potentiometer 86. A second end of the resistor 108 is coupled to the VOLT-FB terminal of the controller 76. Resistor 114, and capacitors 116, 118 are coupled in parallel with one another and interposed between the VOLT-FB terminal and the COMP terminals of the controller 76. A second end of the resistor 106 and the capacitor 112 are coupled to an emitter of a PNP transistor 120. A diode 122 has an anode coupled to ground potential and a cathode coupled to a collector of the transistor 120.

The control sub-circuit 74 further includes a resistor 124 having a first end coupled to the line 28, and a second end coupled to an anode of a zener diode 126. A cathode of the zener diode 126 is coupled to a base of the transistor 120 and to a cathode of a zener diode 128. An anode of the zener diode 128 is coupled to ground potential. A resistor 130 is coupled at one end to the VREF terminal of the controller 76, and at another end to the RT/CT terminal. A capacitor 132 is coupled at one end to the RT/CT terminal of the controller 76, and at another end to ground potential via a resistor 134 coupled in parallel with the diode 122.

A second intermediate terminal 136 of the transformer 40 is coupled to an anode of a diode 138. A cathode of the diode 138 is coupled to a junction 140 via a resistor 142. A first end of a resistor 144 is coupled to the junction 140, and a second end of the resistor 144 is coupled to an anode of a diode 146. A cathode of the diode 146 is coupled to a cathode of the zener diode 98. A capacitor 148 is coupled between the junction 140 and ground potential. A parallel combination of resistor 147 and capacitor 149 are coupled between the cathode of the diode 146 and ground potential.

The control sub-circuit may include a timer 150, such as a TLC 555 timer, for cycling the lamp 48 on and off at predetermined intervals determined by the on/off durations of an output pulse generated by the timer 150. Capacitors 152 154, resistors 156, 158, diode 160 and zener diode 162 bias the timer 150 to provide such output pulses of predetermined on/off durations as determined by the bias component values. A series connected diode 164 and resistor 166 is coupled from an OUT terminal of the timer 150 to the OUT terminal of the controller 76 via a resistor 168, and to the gate of the transistor 64. The OUT terminal of the controller 76 is also coupled to the gate of the transistor 64 via the resistor 168. The VCC terminal of the controller 76 is coupled to a VCC terminal of the timer 150 via a switch 170 and resistor 172, and is also coupled to the line 28 via resistors 174, 176. The I SENSE terminal of the controller 76 is coupled to the emitter of the transistor 64 via resistors 178, 180. The I SENSE terminal is also coupled to ground potential via a capacitor 182. A junction of the resistors 178, 180 is coupled to ground potential via series connected diodes 184, 186.

In operation, the power supply 10 preferably provides a sine wave having a frequency in the range of about 100 Hz. to about 3000 Hz., a voltage level in the range of about 50–400 VAC, and a current level up to about 250 ma. This is intended to drive electroluminescent panels for a range of sizes or panel surface areas up to about 600 in$^2$. Typical applications of the power supply 10 have been at 280 VAC/650 Hz. and 250 VAC/400 Hz. The present invention eliminates the need to provide a differently tuned inverter for each lamp size. As the electroluminescent panel ages, the voltage applied will increase in order to maintain the applied current constant, whereby the diminishment in brightness of the lamp is slowed down over its operating life. Once a predetermined limiting voltage level is reached, the present invention will maintain a fixed voltage in order to prevent a runaway voltage increase. Further, the frequency applied to the lamp is substantially maintained at a constant level in order to prevent shift in the color emanating from the lamp and to prevent accelerated aging of the lamp as is otherwise typical of prior tuned inverters with output compensation. It is known that lamps age more quickly from an increase in frequency than an increase in applied voltage. The power supply 10 is arranged in a resonance topology with the transformer 40 and the capacitor 36 as the primary reactive components.

The power supply or inverter circuit 10 is preferably powered from a 115 vac±10% power source. The rectifier 24 rectifies the AC input signal and develops 170 vdc across the capacitor 32. The resistors 20 and 22 provide current limiting when power is turned on and during line voltage transients. Resonant action takes place when the transistor 64 is turned on by the controller 76. Switching on the transistor 64 draws current through a primary winding of the transformer 40 between the second end terminal 50 and the first intermediate terminal 60, and increases the field in the transformer 40. When the current flowing through the transistor 64 rises to a predetermined or threshold level, the current level represented by the voltage across the resistor 72 is transmitted to the I SENSE terminal of the controller 76, which in response gates off the transistor 64 via the OUTPUT terminal of the controller 76. When the transistor 64 is turned off, the energy in the transformer 40 is transferred to the capacitor 36 and the lamp 48. The controller 76 monitors the voltage across the transistor 64 (as explained more fully below) and turns it on when the voltage is negative. This insures that the transistor 64 always turns on into zero current. As the voltage becomes positive the transistor 64 starts to conduct and stays on until the current reaches the threshold level where the transistor 64 is turned off by the controller 76, as previously described, and the cycle starts over again. This timed turning on and off of the transistor 64 produces a very clean sine wave with a short flat or delay in the positive slope. The electroluminescent lamp 48 is connected across the first end terminal 42 and the second end terminal 50 of the transformer 40 which acts as an auto transformer to boost the voltage to the desired level.

A control sub-circuit is built around the controller 76. The voltage across the transistor 64 (i.e., the voltage level of the supply line 28) is monitored by the controller 76 through the network of the resistor 124, the zener diodes 126, 128 and the transistor 120. When this voltage lowers 5 volts below ground potential, the transistor 120 turns on and forces the voltage level of the $R_T/C_T$ terminal of the controller 76 high which turns the transistor 64 on. Since the transistor 64 is reversed biased no current will flow. As the voltage across the transistor 64 becomes positive current will start to increase. The current in the transistor 64 is monitored by sensing the voltage across the resistor 72. As explained above, the sensed voltage goes through the network of the resistor 180, and the diodes 184 and 186 to clamp the sensed voltage to 1.2 volts and is filtered by the resistor 178 and the capacitor 182 to remove any leading edge transients. When the voltage on the controller 76 rises to the threshold voltage the transistor 64 turns off and the energy stored in the windings of the transformer 40 will transfer to the capacitor 36 and the lamp 48.

The system operates in a constant current mode. Load current is monitored by means of the voltage across the parallel combination of the resistors 56 and 58. The peak of this voltage signal is captured by the diode 78 and the capacitor 80 and held on the capacitor 84. The potentiometer 76 selects a portion of this voltage signal via its wiper 90 to feed into the feedback network at the COMP and the VOLT-FB terminals of the controller 76. Internally to the controller, this voltage signal is used to modify the threshold for current sense at the I SENSE terminal. In this way the on time of the transistor 64 is adjusted to obtain a constant output current. The potentiometer 86 permits manual or automatic adjustment of the level of this current to accommodate a range of electoluminescent lamp sizes.

Although the system is designed to provide constant current, this will be overridden if the voltage across the lamp 48 approaches a predetermined limiting voltage level, such as 320 vac. The winding across the second end terminal 50 and the second intermediate terminal 136 of the transformer 40 feeds a low voltage through the diode 138 to provide power for the controller 76. This voltage is proportional to the output voltage to the lamp 48. As the output approaches 320 vac, the VCC voltage on the capacitors 148 and 149 will rise to exceed the threshold on the zener diode 98. When the zener diode 98 begins to conduct current it is injected into the feedback network through the resistor 102 and has the effect of limiting the rise in the output voltage to about 320 vac to prevent a runaway voltage increase.

When power is first applied from the power source 16 and the power supply 10 has not yet begun operating, the transformer 40 cannot supply any power to the controller 76. During this time the capacitor 148 is charged from a DC bus through the resistors 174 and 176. When the VCC terminal of the controller 76 rises to about 16 volts, the controller 76 will turn on and begin operating.

Figure 2:
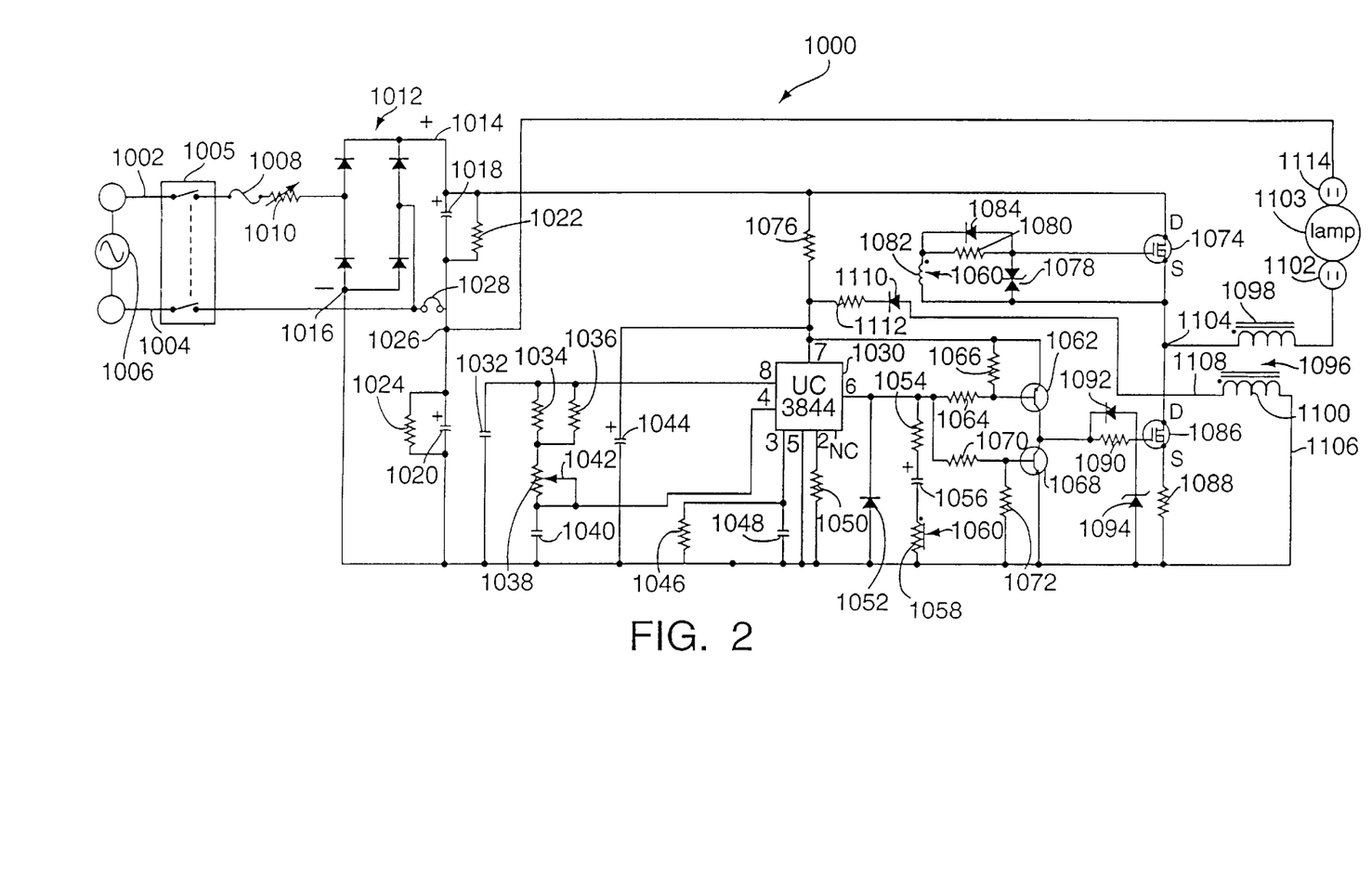
FIG. 2 is a second embodiment of a power supply for an electroluminescent lamp.

Turning now to FIG. 2, a power supply or inverter circuit of a second embodiment of the present invention is generally designated by the reference number 1000. The power supply employs passive constant current feedback and is intended to drive electroluminescent panels for a range of sizes or panel surface areas up to about 2200 $in^2$. The present invention is believed to be the first to employ an AC input where such input is more practical than DC for powering large lamp sizes. The power supply may also be powered directly from a DC source by removing or bypassing the rectification circuit described below. DC operation is useful for automotive and other mobile and remote applications where AC operation is impractical. The power supply includes power source input lines 1002, 1004 to be coupled across a power source 1006, such as a 115 vac power source. A double pole, single throw switch 1005 is coupled to the input lines 1002, 1004 as additional means for coupling or decoupling the power source 1006 from the remainder of the inverter circuit 1000. The input line 1002 preferably includes a time lag fuse 1008 for overcurrent protection, and may include a current limiting resistor 1010. A full wave bridge rectifier 1012 has its AC input lines coupled to the power source input lines 1002, 1004 for rectifying an AC signal generated by the power source 1006 into a DC signal. A positive DC rectifier output of the rectifier 1012 forms a positive junction 1014, and a negative DC rectifier output of the rectifier 1012 forms a negative junction 1016. Capacitors 1018 and 1020 are coupled in series between the positive junction 1014 and the negative junction 1016 of the rectifier 1012. A resistor 1022 is coupled in parallel with the capacitor 1018, and a resistor 1024 is coupled in parallel with the capacitor 1020. The capacitors 1018 and 1020 are coupled to one another at a junction 1026. A jumper 1028 may couple the junction 1026 to the power source input line 1004. The input rating of the inverter circuit 1000 is, for example, 120 VAC, 50/60 Hz with the jumper 1028 engaged, and 240 VAC, 50/60 Hz with the jumper disengaged.

The inverter circuit includes a pwm controller 1030, such as a constant current mode UC 3844 pwm controller as shown in FIG. 2. The controller 1030 has eight terminals: COMP, VFB, C/S, $R_T/C_T$, GND, OUTPUT, VC, and VREF.

A capacitor 1032 is coupled between the VREF terminal of the controller 1030 and the negative junction 1016. Resistors 1034, 1036 are connected in parallel with one another and each have a first end coupled to the VREF terminal of the controller 1030. A potentiometer 1038 has a first end coupled to second ends of the resistors 1034 and 1036, and has a second end coupled to the negative junction 1016 via a capacitor 1040. The potentiometer 1038 includes a wiper 1042 coupled to the $R_T/C_T$ terminal of the controller 1030. A capacitor 1044 is coupled between the VCC terminal of the controller 1030 and the negative junction 1016 of the rectifier 1012. A resistor 1046 and capacitor 1048 are connected in parallel with one another and coupled between the C/S terminal of the controller 1030 and the negative junction 1016. The GND terminal of the controller 1030 is also coupled to the negative junction 1016. The VFB terminal is coupled to the negative junction 1016 via a resistor 1050. An anode of a diode 1052 is coupled to the negative junction 1016 and a cathode is coupled to the OUTPUT terminal of the controller 1030. A resistor 1054 is coupled at a first end to the OUTPUT terminal of the controller, and is coupled at a second end to the negative junction 1016 of the rectifier 1012 via a capacitor 1056. A primary winding 1058 of a transformer 1060 is coupled between the capacitor 1056 and the negative junction 1016. The transformer 1060 is preferably a toroid design to reduce noise and heat generation.

A PNP transistor 1062 has an emitter coupled to the VCC terminal of the controller 1030, and a base coupled to the OUTPUT terminal via a resistor 1064. The base and emitter of the transistor 1062 are coupled to one another via a resistor 1066. An NPN transistor 1068 has a collector coupled to the collector of the transistor 1062, a base coupled to the OUTPUT terminal of the controller 1030 via a resistor 1070, and an emitter coupled to the negative junction 1016 of the rectifier 1012. A resistor 1072 is coupled between the base of the transistor 1068 and the negative junction 1016.

A first power switch 1074, such as the insulated gate field effect transistor (IGFET) shown in FIG. 2 or other power transistor, has a drain coupled to the positive junction 1014 of the rectifier 1012, and to the VCC terminal of the controller 1030 via a resistor 1076. A gate of the transistor 1074 is coupled to its source via a zener diode 1078. A resistor 1080 and a secondary winding 1082 of the transformer 1060 are serially connected and coupled across the zener diode 1078. A diode 1084 is coupled in parallel with the resistor 1080.

A second switch 1086, such as the IGFET shown in FIG. 2 or other power transistor, has a drain coupled to the source of the transistor 1074, and a source coupled to the negative junction 1016 of the rectifier 1012 via a resistor 1088. A gate of the transistor 1086 is coupled to a junction between the collectors of the transistors 1062 and 1068 via a resistor 1090 and diode 1092 connected in parallel with one another. A zener diode 1094 has an anode coupled to the negative junction 1016 and a cathode coupled to the gate of the transistor 1086.

A second transformer 1096 has a primary winding 1098 and a secondary winding 1100. The primary winding has a first end 1102 forming a first output terminal to be coupled to one end of an electroluminescent lamp 1103, and a second end 1104 to be coupled between the source of the transistor 1074 and the drain of the transistor 1086. The secondary winding 1100 has a first end 1106 coupled to the negative junction 1016 of the rectifier 1012, and a second end 1108 coupled to the VCC terminal of the controller 1030 via a series connected diode 1110 and resistor 1112. A second output terminal 1114 for receiving a second end of the electroluminescent lamp 1103 is coupled to a junction between the capacitors 1018 and 1020.

In operation, the power supply 1000 preferably provides a sine wave having a frequency in the range of about 100 Hz. to about 3000 Hz., a voltage level in the range of about 50–400 VAC, and a current level up to about 250 ma to drive electroluminescent panels for a range of sizes or panel surface areas up to about 2200 $in^2$. An AC input signal enters the power supply 1000 from the input lines 1002, 1004 through the double pole, single throw switch 1005 and then through the time lag fuse 1008 and the current limiting resistor 1010 to the full wave bridge rectifier 1012. The DC output of the rectifier 1012 is connected to the junction 1026 of the capacitors 1018 and 1020 such that the junction 1026 becomes the non-switched output of the inverter 1000 at the second output terminal 1114.

Each of the capacitors 1018 and 1020 has one of the associated high impedance resistors 1022, 1024 connected in parallel and functioning to maintain a voltage balance between the capacitors when in operation and discharging them when the power is turned off.

The input power section provides for selecting operation from 120 VAC or 240 VAC by the use of the jumper 1028. The input rating of the inverter circuit 1000 is, for example, 120 VAC, 50/60 Hz with the jumper 1028 engaged, and 240 VAC, 50/60 Hz with the jumper disengaged.

The main control component is the controller 1030. Initial DC start up power is supplied to the VC terminal through the resistor 1076 and is filtered by the capacitor 1044. The sustaining operating DC power is supplied from the boost reactor secondary winding 1100 of the transformer 1096 through the diode 1110 and the resistor 1112. The control circuit operating voltage is regulated internally within the controller 1030 by a zener diode.

The operating frequency of the inverter circuit 1000 is determined by an oscillator within the controller 1030. The operating frequency of the oscillator is controlled by a network of the resistors 1034, 1036, the potentiometer 1038 and the capacitor 1040. The values of the network components are selected to provide the desired output of approximately 400 Hz. Trim is provided by the adjustable wiper 1042 of the potentiometer 1038.

The output signal of the controller 1030 proceeds through two separate paths to drive the transistors 1074 and 1086 alternately on and off at the operating frequency of the lamp load.

With reference to the first path, the output drive signal from the controller 1030 is a positive voltage or plus going pulse which is prevented from going to a negative voltage due to inductive reactance of the transformer 1060 by the clamping diode 1052. The first path takes the plus going pulse through the resistor 1054 and through the capacitor 1056 to the primary winding 1058 of the isolated coupling transformer 1060. The secondary winding 1082 of the transformer 1060 is connected to the gate of the transistor 1074 via the resistor 1080 which has the damping diode 1084 in parallel with it. The zener diode 1078 protects the gate of the transistor 1074 from overvoltage or transient spikes.

With reference to the second path, the transistor 1086 must be held off while the transistor 1074 is switched on. Therefore the transistor 1086 must be off any time there is a positive voltage signal issuing from the OUTPUT terminal of the controller 1030, and it follows that the transistor 1086 must switch on when there is no output signal issuing from the OUTPUT terminal of the controller 1030. This logic is achieved by inverting the controller output switching signal to the transistor 1086 by means of the transistors 1062 and 1068.

A positive voltage signal from the OUTPUT terminal of the controller 1030, which switches the transistor 1074 on, travels through the resistor 1064 to the base of the PNP transistor 1062 driving it off. The same signal travels through the resistor 1070 to the base of the NPN transistor 1068 driving it on. When the transistor 1068 is switched on the gate of the transistor 1086 is clamped through the resistor 1090, holding it off.

A zero voltage signal from the OUTPUT terminal of the controller 1030 allows the transistor 1068 to be biased off by the action of the clamping resistor 1072 while at the same time the transistor 1062 is biased on by having its base biased negative by the resistor 1064 in relation to its emitter which is held positive by the positive voltage supply of the VC terminal of the controller 1030. With the transistor 1062 biased on, a positive voltage signal is fed to the transistor 1086 through the resistor 1090 driving it on.

The diode 1092 is a clamping diode parallel to the resistor 1090, and the zener diode 1094 is a voltage limiting zener diode connected from gate of the transistor 1086 to the negative junction 1016 of the rectifier 1012 to protect the gate of the transistor 1086 from overvoltage.

The final power switching stage of the inverter circuit 1000 includes the two transistors 1074 and 1086 which switch the first output terminal 1102 from the high voltage DC supply high side to the supply low side through the boost inductor secondary winding 1100. The first output terminal 1102 is connected to one side of the lamp load and the return leg of the lamp is connected to the second output terminal 1114 which is coupled to the junction of the capacitors 1018, 1020 which insures that only AC power will be supplied to the electroluminescent panel load, since the capacitors effectively decouple any DC component that might occur due to uneven switching of the output stage.

The primary winding 1098 of the transformer or reactor 1096 connected in series with the lamp load has, for example, 550 turns, and is tuned to provide a voltage boost and current averaging to the appropriate capacitive load at about 400 Hz. A constant current level is achieved by a passive interaction between the inductance of the transformer 1096 and a changing capacitance of the lamp 1103 due to aging over its operating life. The current averaging characteristic of this reactor helps the lamp 1103 stay relatively bright as it ages and loses capacitance by delivering a compensating higher voltage as the load current tries to diminish.

The output boost reactor 1096 has a small, isolated secondary winding 1100 having, for example, 25 turns which is used to supply the operating power for the controller 1030 through the diode 1110 and the resistor 1112 as soon as the inverter circuit 1000 has achieved a sustained output.

The inverter circuit 1000 can operate over a wide range of loads within its maximum power rating, providing that the reactor inductance is matched to the capacitance of the lamp.

Figure 3:
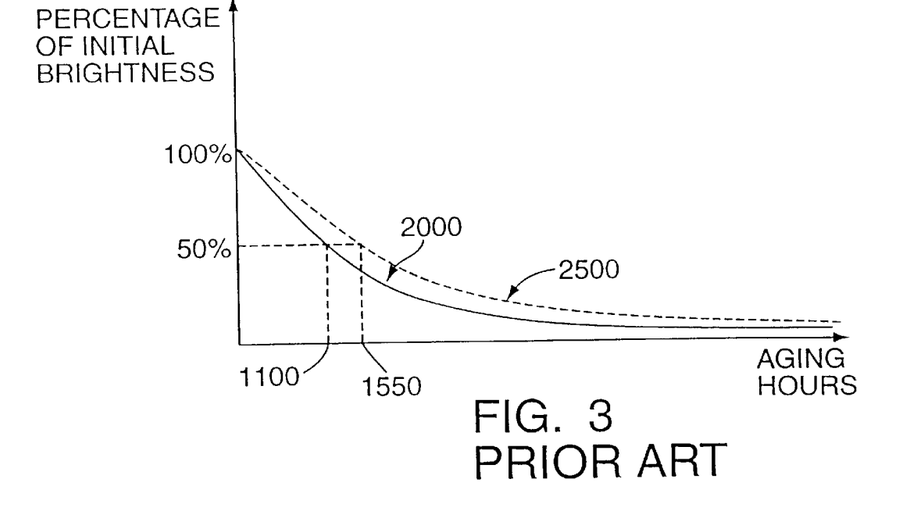
FIG. 3 is a graph illustrating the change in brightness of an electroluminescent lamp over it operating life when powered by prior control devices.
Figure 4:
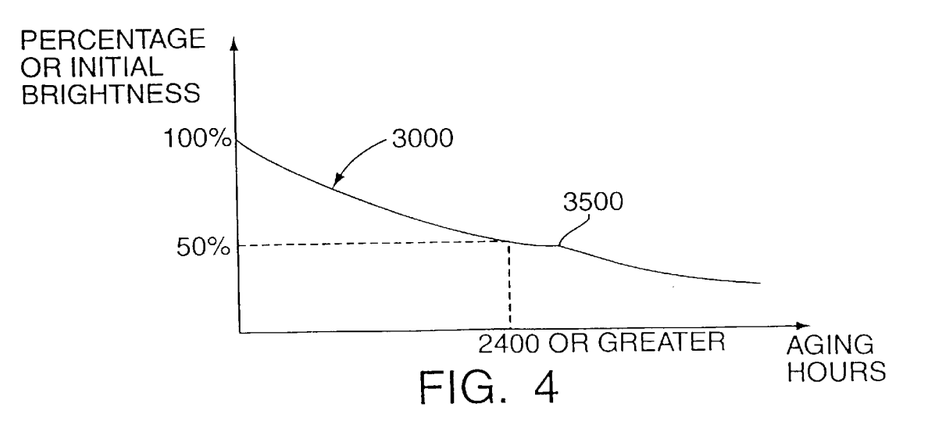
FIG. 4 is a graph illustrating the change in brightness of an electroluminescent lamp over it operating life when powered by inverter circuits embodying the present invention.

FIGS. 3 and 4 are graphs illustrating the different brightness characteristics of electroluminescent lamps powered by prior power supply means (FIG. 3) and by inverter circuits embodying the present invention (FIG. 4). Of particular interest is the total operating life and the half operating life of an electroluminescent lamp. The total operating life is the usable length of time (usually expressed in hours) of the lamp. The half operating life is the length of operating time it takes due to aging for the lamp's brightness to lower to about half the initial brightness.

As shown in FIG. 3, an electroluminescent panel powered by a conventional inverter having a fixed output operating at, for example, about 280 volts and 650 Hz, lowers to only 50% of its initial brightness after operating for about 1100 hours, as shown by a solid curve 2000. An electroluminescent panel powered by a conventional inverter having a frequency and voltage compensated output in a range roughly covering that of the fixed output inverter lowers to only 50% of its initial brightness after operating for about 1550 hours, as shown by a dotted line curve 2500.

FIG. 4 shows by means of curve 3000 that a lamp powered by an inverter circuit embodying the present invention and operating in a range covering 280 volts and 650 Hz drops to only 50% of its initial brightness after operating for about 2400 hours. (The curve 3000 begins to decrease in brightness at a faster rate when voltage limiting takes effect at point 3500 along the curve.) In other words, the half operating life of a lamp powered by the present invention is increased over two times compared to lamps powered by conventional supplies having a fixed output, and is increased about 66% compared to lamps powered by conventional supplies having a compensated output. The increased half operating life means that lamps powered by the present invention maintain their brightness for a longer initial period of operation even though the total operating life is decreased. This trade-off of shorter total operating life in return for a longer half operating life fulfills the market demand previously mentioned for power supplies which maintain the initial brightness of electroluminescent panel.

Although this invention has been shown and described with respect to exemplary embodiments thereof, it should be understood by those skilled in the art that the foregoing and various other changes, omissions, and additions in the form and detail thereof may be made therein without departing from the spirit and scope of the invention. For example, constant current and frequency may be achieved by appropriate means other than active or passive constant current feedback, such as by high frequency switching circuits. Accordingly, the invention has been described by way of illustration rather than limitation.

What is claimed is:

1. An inverter circuit for regulating power to electroluminescent lamps over a range of lamp sizes, comprising:

at least one switch having a power input to be coupled to an electrical power source, a control input, and an output to be coupled to an electroluminescent lamp for being switched on and off to generate a drive signal to the lamp having a predetermined frequency and current level; and a constant current mode controller for turning the switch on and off so as to maintain a constant current level and frequency of the drive signal to the electroluminescent lamp, and for increasing a voltage level of the drive signal to compensate for aging of the lamp, the current and frequency levels of the drive signal being selectable over a range of values, whereby the inverter circuit powers a range of lamp sizes and substantially prevents color shift in the lamp, wherein said inverter circuit further comprises means for setting a predetermined limiting value for the voltage level of the drive signal so as to cause the inverter circuit to operate with a constant voltage drive signal once the voltage level of the drive signal has reached the predetermined limiting value.

2. An inverter circuit as defined in claim 1, wherein the constant current mode controller is a 3842 controller.

3. An inverter circuit as defined in claim 1, wherein the constant current mode controller is a 3844 controller.

4. An inverter circuit as defined in claim 1, wherein the constant current mode controller includes a current sense input coupled to a current path of the switch for monitoring current therethrough.

5. An inverter circuit as defined in claim 1, wherein the drive signal generated by the inverter circuit has a voltage level in the range of about 50 volts to about 400 volts.

6. An inverter circuit as defined in claim 1, wherein the drive signal generated by the inverter circuit has a frequency in the range of about 100 Hz. to about 3000 Hz.

7. An inverter circuit as defined in claim 1, wherein the drive signal generated by the inverter circuit has a voltage level of about 280 VAC and a frequency of about 650 Hz.

8. An inverter circuit as defined in claim 1, wherein the drive signal generated by the inverter circuit has a voltage level of about 250 VAC and a frequency of about 400 Hz.

9. An inverter circuit as defined in claim 1, further including a bridge rectifier having an input to be coupled to an ac power source and an output to be coupled to the input of the switch.

10. An inverter circuit as defined in claim 1, wherein said limiting voltage level setting means comprises a transformer having a primary winding coupled across the switch and a first secondary winding to be coupled across the electroluminescent lamp for powering the electroluminescent lamp, and a second secondary winding to be coupled to a current rectifying device to provide power to said constant current mode controller.

11. An inverter circuit as defined in claim 10, wherein the transformer is an auto transformer.

12. An inverter circuit as defined in claim 10, wherein the transformer is in the form of a toroid.

13. An inverter circuit as defined in claim 1, wherein the switch is a power MOSFET having a gate coupled to a control output of the controller for controlling the switch on/off time to generate the drive signal, and one of the gate and source of the power MOSFET being coupled to the current sense input of the controller for switching off the switch when the current level sensed by the controller exceeds a predetermined level.

14. An inverter circuit as defined in claim 10, wherein said current rectifying device comprises a diode and a resistor connected in series, said inverter circuit further including:
a capacitor coupled to said current rectifying device to provide a sensing voltage; and
a voltage limiting device to sense said sensing voltage in order to cause said inverter circuit to operate with a constant voltage drive signal once the voltage level of the drive signal has reached the predetermined limiting value.

15. An inverter circuit for regulating power to electroluminescent lamps over a range of lamp sizes, comprising:
at least one switch having a power input to be coupled to an electrical power source, a control input, and an output to be coupled to an electroluminescent lamp for being switched on and off to generate a drive signal to the lamp having a predetermined frequency and current level; and
a constant current mode controller for turning the switch on and off so as to maintain a constant current level and frequency of the drive signal to the electroluminescent lamp, and for increasing a voltage level of the drive signal to compensate for aging of the lamp, the current and frequency levels to the drive signal being selectable over a range of values, whereby the inverter circuit powers a range of lamp sizes and substantially prevents color shift in the lamp, and a timer circuit coupled to a power source input of the controller for sequencing on and off an electroluminescent panel.

16. An inverter circuit as defined in claim 15, wherein the timer circuit includes a 555 timer.

17. A method of regulating power to an electroluminescent lamp over a range of lamp sizes, comprising the steps of:
providing at least one switch having an input coupled to an electric power source, and an output for transmitting an electric power drive signal to illuminate an electroluminescent lamp;
selecting a current level and frequency of an ac drive signal to be applied to the lamp;
opening and closing the switching in order to generate the ac drive signal for illuminating the lamp at the selected current and frequency, whereby the inverter circuit powers a range of lamp sizes and substantially prevents color shift in the lamp, and for maintaining a constant current level of the drive signal while increasing a voltage level of the drive signal to compensate for aging of the lamp; and
setting a predetermined limiting value for the voltage level in order to cause the drive signal to become a constant voltage drive signal once the voltage level has reached the predetermined limiting value.

18. A method of regulating power to an electroluminescent lamp as defined in claim 17, further including the step of sensing the current level flowing through the switch, the step of opening and closing includes opening and closing the switch in response to the sensed current level flowing through the switch.

19. A method of regulating power to an electroluminescent lamp as defined in claim 17, wherein the switch is a first switch, and further providing a second switch coupled in series with the first switch, and alternating the on and off times of the first and second switches to generate the ac drive signal.

20. A method of regulating power to an electroluminescent lamp as defined in claim 17, further including stepping-up the voltage of the drive signal.

21. A method of regulating power to an electroluminescent lamp over a range of lamp sizes, comprising the steps of:
providing at least one switch having an input coupled to an electric power source, and an output for transmitting an electric power drive signal to illuminate an electroluminescent lamp;
selecting a current level and frequency of an ac drive signal to be applied to the lamp;
opening and closing the switching in order to generate the ac drive signal for illuminating the lamp at the selected current and frequency, whereby the inverter circuit powers a range of lamp sizes and substantially prevents color shift in the lamp; and
cycling a transmission of the drive signal to the lamp at predetermined on/off intervals to cycle the lamp on and off.

22. An inverter circuit for regulating power to electroluminescent lamps over a range of lamp sizes, comprising:
- at least one switch having a power input to be coupled to an electrical power source, a control input, and an output to be coupled to an electroluminescent lamp for being switched on and off to generate a drive signal to the lamp having a predetermined frequency and current level; and
- means for providing a selected constant current level and frequency of the drive signal to the electroluminescent lamp and increasing a voltage level of the drive signal up to a predetermined limiting value to compensate for aging of the lamp, whereby the inverter circuit powers a range of lamp sizes and substantially prevents color shift in the lamps.

23. An inverter circuit for regulating power to electroluminescent lamps over a range of lamp sizes, comprising:
- at least one switch having a power input to be coupled to an electrical power source, a control input, and an output to be couple to an electroluminescent lamp for being switched on and off to generate a drive signal to the lamp having a predetermined frequency and current level;
- means for providing a selected constant current level and frequency of the drive signal to the electroluminescent lamp and increasing a voltage level of the drive signal up to a predetermined limiting value to compensate for aging of the lamp, whereby the inverter circuit powers a range of lamp sizes and substantially prevents color shift in the lamp, and
- means for providing temperature compensation that limits a voltage level of the drive signal to a predetermined value in order to prevent runaway voltage.

24. An inverter circuit for regulating power to electroluminescent lamps over a range of lamp sizes, comprising:
- at least one switch having a power input to be coupled to an electrical power source, a control input, and an output to be coupled to an electroluminescent lamp for being switched on and off to generate a drive signal to the lamp having a predetermined frequency and current level; and
- a constant current mode controller for turning the switch on and off so as to generate a pulse width modulated (PWM) waveform in order to maintain a constant current level and frequency of the drive signal to the electroluminescent lamp, and for increasing a voltage level of the drive signal to compensate for aging of the lamp, the current and frequency levels of the drive signal being selectable over a range of values, whereby the inverter circuit powers a range of lamp sizes and substantially prevents color shift in the lamp.

25. A method of regulating power to an electroluminescent lamp over a range of lamp sizes, comprising the steps of:
- providing at least one switch having an input coupled to an electric power source, and an output for transmitting an electric power drive signal to illuminate an electroluminescent lamp;
- selecting a current level and frequency of an ac drive signal to be applied to the lamp;
- opening and closing the switching in order to generate a pulse width modulated (PWM) waveform for providing the ac drive signal for illuminating the lamp at the selected current and frequency, whereby the inverter circuit powers and range of lamp sizes and substantially prevents color shift in the lamp.

26. An inverter circuit for regulating power to electroluminescent lamps over a range of lamp sizes, comprising:
- at least one switch having a power input to be coupled to an electrical power source, a control input, and an output to be coupled to an electroluminescent lamp for being switched on and off to generate a drive signal to the lamp having a predetermined frequency and current level;
- a constant current mode controller for turning the switch on and off so as to maintain a constant current level and frequency of the drive signal to the electroluminescent lamp, and for increasing a voltage level of the drive signal to compensate for aging of the lamp, the current and frequency levels of the drive signal being selectable over a range of values; and
- an inductive reactor element connected in series with the lamp, said reaction element being tuned to provide a voltage boost and to arrange the inverter in a resonance topology.

* * * * *